United States Patent [19]

Sigler

[11] 4,084,887

[45] Apr. 18, 1978

[54] ALL-REFLECTIVE OPTICAL TARGET ILLUMINATION SYSTEM WITH HIGH NUMERICAL APERTURE

[75] Inventor: Robert D. Sigler, Ann Arbor, Mich.

[73] Assignee: KMS Fusion, Inc., Ann Arbor, Mich.

[21] Appl. No.: 684,094

[22] Filed: May 7, 1976

[51] Int. Cl.² .............................................. G02B 5/10
[52] U.S. Cl. .................................... 350/294; 350/299
[58] Field of Search .................. 350/294, 299, 199, 55

[56] References Cited

FOREIGN PATENT DOCUMENTS 501,294  6/1930  Germany ............................... 350/55

OTHER PUBLICATIONS

Laser Program Annual Report, 1974, "Angle-Amplifying Optics", Glass, pp. 238-239, Oct. 1975.

Primary Examiner—Jon W. Henry
Attorney, Agent, or Firm—Barnes, Kisselle, Raisch & Choate

[57] ABSTRACT

An all-reflective optical system for providing illumination of a target focal region at high numerical aperture from a pair of co-axially, confluent collimated light beams. A target cavity is defined by a pair of opposed inner ellipsoidal reflectors having respective first focal points within a target region and second focal points at a vertex opening in the opposing reflector. Outwardly of each inner reflector is the opposed combination of a spherical reflector, and an outer generally ellipsoidal reflector having an aberrated first focal point coincident with the focus of the opposing spherical reflector and a second focal point coincident with the second focal point of the opposing inner ellipsoidal reflector through a vertex opening in the spherical reflector. The confluent collimated beams are incident through vertex openings in the outer ellipsoidal reflectors onto respective opposing spherical reflectors. Each beam is reflected by the associated spherical reflector onto the opposing outer ellipsoidal reflector and focused thereby onto the opposing inner ellipsoidal reflector, and then onto the target region.

7 Claims, 3 Drawing Figures

ALL-REFLECTIVE OPTICAL TARGET ILLUMINATION SYSTEM WITH HIGH NUMERICAL APERTURE

The present invention relates to focused optical systems and, more specifically, to optical systems for providing illumination of a target focal region at high numerical aperture.

Combinations of reflective and refractive optics have heretofore been proposed and/or used to provide high numerical aperture illumination at a target focal region. One example of such a reflective/refractive system is disclosed in Thomas, "Optics for Laser Fusion," *Laser Focus,* Advanted Technology Publications, Inc., Newton, Mass., June 1975, pages 49–51. In the Thomas system, convergent collimated laser beams are focused by a pair of fast (high numerical aperture or, stated differently, low f-number) aspheric lens into a target cavity defined by a pair of opposing ellipsoidal reflectors. One focus of each reflector and the focus of the associated lens are located in coincidence at a vertex opening in the opposing reflector, while the other reflector foci are substantially coincident at the cavity center. Each beam provides substantially uniform, orthogonal and complete converage of an opposing hemisphere of the target region. Where the requirement for normal or orthogonal incidence at the target region is removed and the reflector foci are slightly separated from the target center, full target coverage is obtained. The reflective/refractive system so disclosed has been used quite successfully in laser fusion experiments, some results of which are noted in detail in the above-referenced Thomas publication.

Some inherent disadvantages of the Thomas system have heretofore been noted. For example, in Glass, "Design of Aspheric Optics," *Laser Program Annual Report*-1974, Lawrence Livermore Laboratory, Livermore, California, 1975, pages 234–239, it was noted that, because of the relatively high nonlinear index of glass from which the refractive elements, i.e., the lenses, are ground, the amount of refractive material in each beam path should be minimized to reduce distortion. To obtain high numerical aperture focusing in systems of the type described, Glass proposed that the relatively fast (80° cone angle) Thomas focusing lens be replaced by a slower lens having a focused cone angle of about 46.6°. The focal point of the Glass lens is at a vertex opening of a supplementary or outer ellipsoidal reflector having its first focus at the entrance to the Thomas cavity, i.e., at the vertex of one of the cavity-defining inner ellipsoidal reflectors. A plane mirror is disposed at the supplementary reflector focus normal to the axis of the collimated incident beam and effectively "folds" the second focus of the supplementary reflector into coincidence with the lens focus. The supplementary ellipsoidal and plane mirrors effectively amplify the cone angle of the focused beam such that the beam at the entrance to the target cavity has a cone angle at least a great as the 80° entrance cone angle of the Thomas system.

Although the Glass proposal may have certain advantages over the Thomas system, the proposal at best merely reduces inherent non-linearity problems and limitations associated with the use of refractive optics in high numerical aperture illumination systems of the type described. However, several problems remain unsolved. For example, there are difficulties in coating the relatively steep surfaces of the focusing lens for the purpose of reducing reflection losses. As a result, energy loss on the order of ten to fifteen percent has resulted due to reflections at the lens. Furthermore, the lens index of refraction is a non-linear function of beam field strength. Thus, variations or "hot spots" in beam spatial profile affect the focal properties of the lens in a way which tends to increase the size of the focal spot, and to reduce the overall efficiency of target illumination. Internal reflections may also cause severe lens damage. To help limit the problems associated with internal reflections, the lenses in the Thomas system, for example, have been cored, a time consuming and expensive operation.

Moreover, the lens refractive index and focal properties vary with beam frequency. Thus, a refractive element designed for use at one preselected frequency must be either replaced by a second lens for operation at a different illumination frequency, or supplemented by one or more spheric or aspheric corrector plates, thus adding additional glass in each beam path. In any case, unless expensive multimaterial achromatic refractive elements are used, the entire system must be refocused for each illumination frequency. Target illumination with a high numerical aperture beam having several frequency components has not been attempted, particularly in laser fusion experiments, due in part to the above-mentioned inherent limitations and focusing problems associated with refractive optics.

It is an object of the present invention to provide a high numerical aperture target illumination system which eliminates the above-mentioned difficulties of the reflective/refractive systems heretofore used or proposed. More specifically, it is an object of the present invention to provide an all-reflective high numerical aperture system for optically illuminating a target region.

It is a further object of the present invention to provide an all-refractive high numerical aperture illumination system of the described type wherein all of the reflective surfaces are contoured as three-dimensional rotationally symmetric conic sections, i.e., spheres, ellipsoids, paraboloids and/or hyperboloids.

It is yet another object of the present invention to provide an all-reflective high numerical aperture illumination system of the described type which finds specific use and advantages in the conduction of laser-driven fusion research.

The novel features which are considered to be characteristic of the present invention are set forth in particular in the appended claims. The invention itself, however, together with additional objects, features and advantages thereof, will be best understood from the following description when read in conjunction with the accompanying drawings in which:

Figure 1:
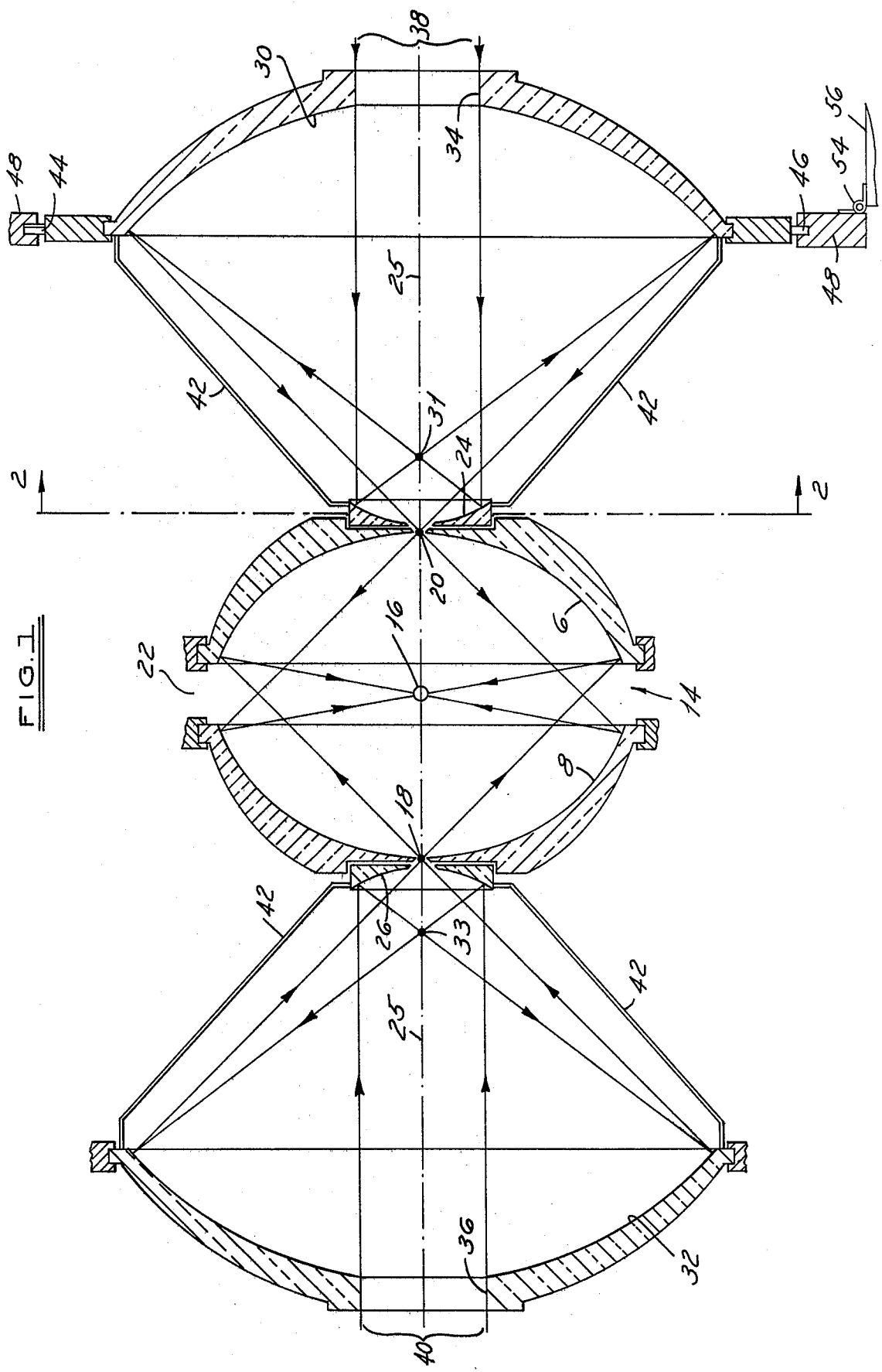
FIG. 1 is a sectioned, partial, elevational view of a presently preferred embodiment of the invention.

Referring to FIG. 1, a pair of spaced, co-axial, concave ellipsoidal reflective surfaces or reflectors 6, 8 are disposed in opposed relation to define a target cavity 14 in accordance with the above-referenced Thomas publication. Reflective surfaces 6, 8 have respective first focal points in substantial coincidence within a target region 16. The second focal points of reflectors 6, 8 are located at the centers 18, 20 of conical vertex openings in opposing reflectors 8, 6, respectively. The common axis 25 of reflectors 6, 8 on which target region 16 and centers 18, 20 lie is referenced hereinafter as the system axis. Reflectors 6, 8 are separated by a space 22.

A pair of spherical reflectors 24, 26 are respectively disposed in recessed cavities formed in the outer, non-reflective surfaces of reflectors 6, 8 co-axially therewith and facing outwardly therefrom, each of the reflectors 24, 26 having a conical vertex opening on system axis 25 in surface alignment with the openings in reflectors 6, 8. A pair of outer reflectors 30, 32 having inwardly directed, generally ellipsoidally contoured reflective surfaces are disposed co-axially with and in opposition to reflectors 24, 26, respectively. Reflectors 30, 32 have axial cylindrical openings 34, 36 formed at the respective vertexes thereof, and are disposed with respect to reflectors 8, 6 and 24, 26, such that the first focal point of reflectors 30, 32, which are slightly aberrated as will be explained hereinafter, are respectively coincident at points 31, 33 with the foci of reflectors 24, 26 and the second focal point of reflectors 30, 32 are coincident with the second focal points of reflectors 8, 6 at opening center points 20, 18. Openings 34, 36 are of sufficient diameter to admit co-axially confluent collimated beams 38, 40 from a laser amplifier system (not shown). In accordance with the above referenced Thomas publication, beams 38, 40 preferably comprise split portions of a single collimated laser beam, the split portions being each suitably reflected to be co-axially and simultaneously directed toward target region 16 along axis 25 from opposite directions.

Tracing the path of beam 38 through the system provided by the invention, the beam is incident through opening 34 upon spherical reflector 24, and is reflected thereby onto the opposing surface of reflector 30 to be focused at opening center 20 at a beam cone angle of about 90°. Stated differently, the combination of reflectors 24, 30 amplify the cone angle or aperture of beam 38 from zero, for a collimated beam, to 90° at the entrance to target cavity 14. The aperture-amplified beam is then incident upon reflector 8 and directed onto an opposing hemisphere of target region 16 at a cone angle of about 160°. Beam 40 is incident upon the opposite hemisphere of target region 16 after traveling a complementary aperture-amplifying path provided by reflectors 26, 32 and 6 successively.

Reflectors 6, 8, 24, 26, 30 and 32 are preferably formed by depositing multiple layers of thin dielectric coating on respective glass/ceramic substrates having a low or zero coefficient of thermal expansion. Alternatively, substrates of nickel-plated aluminum may be used. It will be recognized, of course, that the geometric contour of each reflector described generally above and in greater detail hereinafter is in reference to the reflective surface thereof. The geometry and dimensions of the mirror bodies or substrates upon which the reflective surfaces are formed are primarily a matter of design choice depending upon the intended application, etc.

Reflectors 6, 8 each have a preferred surface eccentricity of 0.3333 (⅓). When reflectors 24, 26 have spherical surface contours as preferred, the surface contours of reflectors 30, 32 are generally ellipsoidal with the addition of some higher order aspheric terms, and are described by the equation:

$$z = \frac{cy^2}{[1 + \sqrt{1 - (k+1)c^2y^2}]} + dy^4 + ey^6 + fy^8 + gy^{10} \quad (1)$$

wherein $z$ is the sag or departure of the reflective surface from a plane tangent to the vertex thereof, $c$ is the axial curvature or inverse vertex radius, $y$ is the distance to the reflective surface measured from the system axis 25, $k$ is the surface conic constant which is equal to minus the square of the eccentricity, and $d, e, f$ and $g$ are higher order aspheric coefficients for $y$. The addition of higher order terms in equation (1) results in slightly aberrated first ellipsoidal foci at 31, 33, as is well known in the optics art. However, as is also well recognized, by locating such aberrated foci in coincidence with foci of spherical reflectors 24, 26, such aberrations are effectively cancelled yielding sharp ellipsoidal second foci at 20, 18, respectively.

In one preferred embodiment of the invention wherein collimated beams 38, 40 have beam diameters of 280 mm (millimeters), spherical reflectors 24, 26 each have the following parameters in millimeters (mm):

| | |
|---|---|
| radius | −315.319 mm |
| vertex opening dia. | 28 mm (max.) |
| clear aperture | 315 mm |
| intercept dia. (collimated beam dia.) | 280 mm |

Reflectors 30, 32 each have the following parameters:

| | |
|---|---|
| vertex radius (1/c) | −912.103 mm |
| conic constant (k) | −0.043494 |
| intercept dia. (y max.) | 1400 mm |
| vertex opening dia. | 294 mm |
| clear aperture | 1420 mm |
| d | $0.3050077 \times 10^{-12}$ |
| e | $0.3094228 \times 10^{-8}$ |
| f | $0.1244719 \times 10^{-24}$ |
| g | $0.3225329 \times 10^{-30}$ |

The spacing between the vertic of the respective spherical ellipsoidal surface combinations is 986.845 mm. The vertex of each reflector 24, 26 is displaced outwardly from the respective focal points 20, 18 by a distance of 26.601 mm.

In addition to satisfying all of the objects and aims hereinabove set forth, including the complete elimination of all of the noted difficulties and inherent restrictions associated with the use of refractive elements in high numerical aperture target illumination systems, the preferred embodiment of the invention provides several, perhaps less obvious advantages. For example, the system elements which undergo the highest illumination intensity per unit area, and are therefore the most likely to be damaged, are the elements which are the most economical to fabricate and inspect, i.e., spherical reflectors 24, 26. Power transmission efficiencies at the target region as high as 95% can be realized, as opposed to about 82% for the above-referenced Thomas apparatus. Obscuration, which is a measure of the percentage of energy lost at the target region due to the reflector vertex openings, is about 4% in the specific example given. The level of obscuration may be made even smaller by increasing the diameter of reflective surfaces 30, 32 and the spherical/ellipsoidal reflector spacing, and by appropriately modifying the remaining reflector parameters of equation (1). However, the overall system dimensions rapidly become quite large without significantly decreasing the obscuration level. The described embodiment is considered to represent a reasonable compromise between obscuration level and overall system size.

Figure 2:
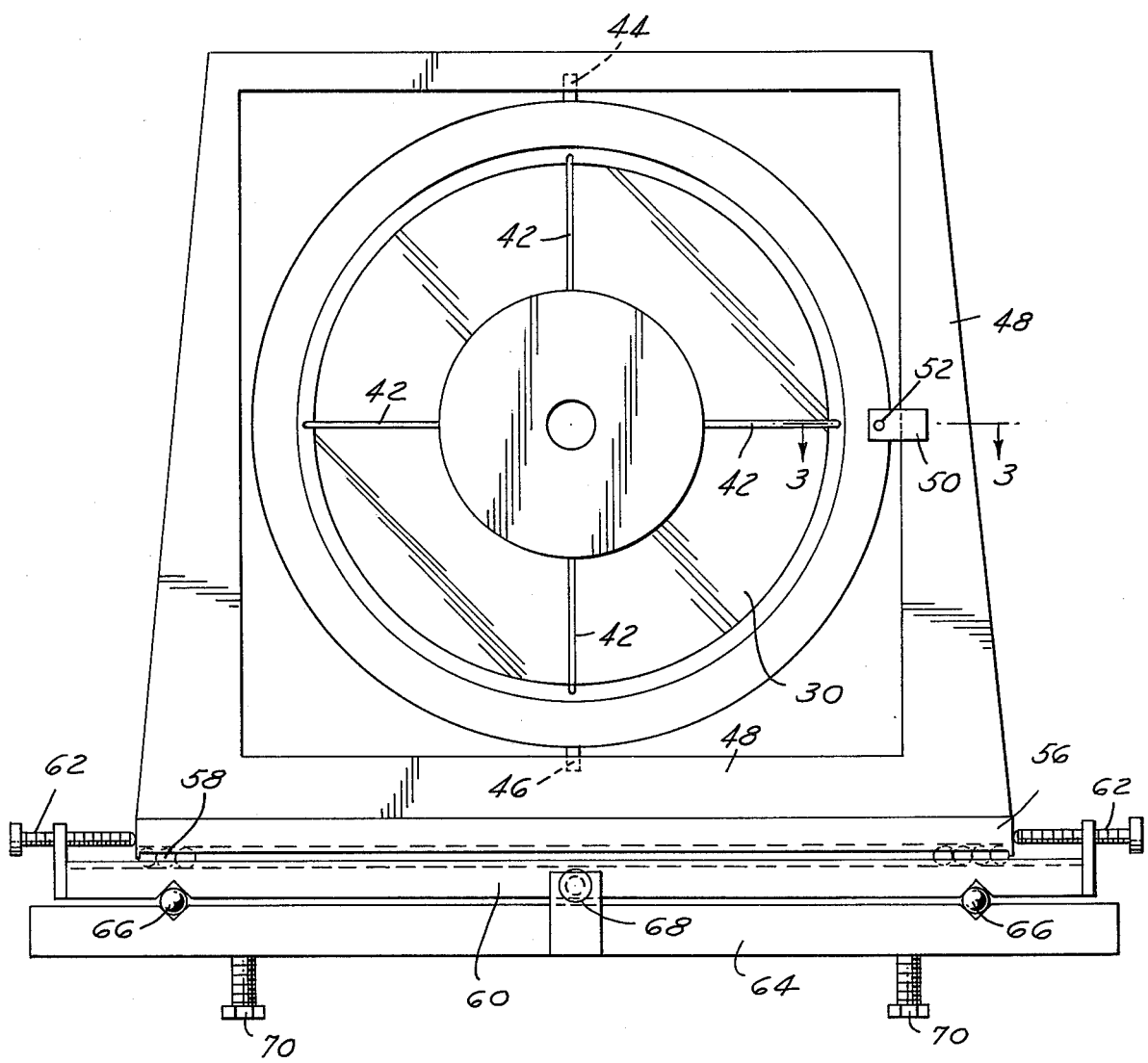
FIG. 2 is a sectional schematic view taken along the line 2—2 of FIG. 1 showing an adjustable mounting apparatus which may be used with the invention.
Figure 3:
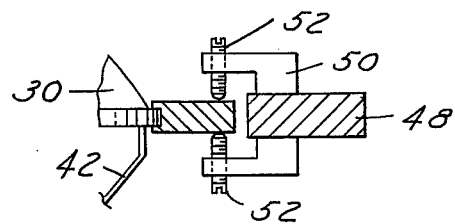
FIG. 3 is a partial sectional view taken along the line 3—3 of FIG. 2.

It will be evident that, for maximum focusing efficiency, each of the elements of FIG. 1 should be carried by a suitable gimbal mounting arrangement for independent adjustment in several directions. Such a mounting arrangement will be described in connection with reflectors 24, 30, it being understood that similar arrangements are to be provided for the other system reflectors. Referring to FIGS. 1—3, reflector 24 is carried and positioned with respect to reflector 30 by four adjustable support struts 42. Reflector 30 is mounted by the upper and lower hinge pins 44, 46 to a reflector support frame 48. A bracket 50 and a pair of opposing lead screws 52 are carried on one side of frame 48 for adjusting the angle of reflector 30 (and reflector 24) about the vertical axis transverse to the drawing as viewed in FIG. 1. Frame 48 is hinged, as at 54 (FIG. 1), to a support plate 56, and suitable adjustment screws, etc. (not shown) are provided for adjustably rotating frame 48 (and reflectors 30, 24) about the horizontal axis into the drawing as viewed in FIG. 1 and transverse to the drawing as viewed in FIG. 2. Frame support plate 56 is mounted by a pair of roller guides 58 (FIG. 2) to an intermediate support plate 60, and screws 62 are provided on plate 60 for linear adjustment of plate 56 (as well as frame 48 and reflectors 30, 24) in one horizontal direction. Intermediate plate 60 is mounted by a second pair of roller guides 66 to a base plate 64, and screws 68 are provided at both sides of base plate 64 (one side not shown) for linear adjustment of intermediate plate 60 (as well as plate 56, frame 48 and reflectors 30, 24) in the second horizontal direction. Suitable levelers 70 or the like are provided for adjusting the entire super structure in the vertical direction. Thus, reflectors 30, 24 may be adjusted in each of the three linear directions, and about the vertical and one horizontal axes. It will be evident that each of the elements in FIG. 1 is symmetrical about the longitudinal or system horizontal axis 25 and thus need not be adjustable in that rotation.

Although the invention has been described in connection with one presently preferred embodiment thereof, many alternatives, modifications and variations will readily suggest themselves to persons skilled in the art in view of the foregoing discussion. For example, it will be apparent that the several specific parameters set forth above with reference to reflectors 24, 26 and 30, 32, which parameters have been provided merely for the purpose of illustration, may be varied without departing from the scope of the invention. Indeed, other conic section reflecting surface contour combinations, i.e., ellipsoids, hyperboloids, paraboloids and spheres, may be readily envisioned. In one alternative embodiment of the invention presently envisioned, reflectors 24, 26 may be paraboloidal and reflectors 30, 32 may be ellipsoidal. This embodiment has the advantage that the surface contours of all reflectors are simple conic sections, i.e., without higher order aspheric terms, and are thus less expensive to fabricate and test than are the generally ellipsoidal reflectors 30, 32 in the preferred embodiment. However, in the suggested alternative embodiment, the reflectors most susceptible to damage due to high illumination density are more expensive than are the simple spherical reflectors 24, 26 of the preferred embodiment.

Moreover, the gap 22 between reflectors 6, 8 is provided to allow observation of the effects of target illumination, as discussed in detail in the above-referenced Thomas publication. However, where such observation is not required, the present invention may be readily modified to provide full 180° illumination normal at all points to the target region, a result for which the Thomas reflective/refractive system cannot be directly adapted because of the inherent refraction index limitations of the aspheric lens elements. The present invention is intended to embrace the above-noted and all other alternatives, modifications and variations as fall within the spirit and broad scope of the appended claims.

I claim:

1. In an optical system for providing illumination of a target region at high numerical aperture from a pair of collimated beams of electromagnetic energy co-axially confluent on a system axis, and comprising a pair of opposed first ellipsoidal reflectors disposed to define a target cavity about said target region and having respective openings on said system axis, the improvement comprising means providing spherical reflective surfaces respectively disposed and directed outwardly of said target cavity having first openings on said system axis, and means providing conic section reflective surfaces disposed and directed oppositely of respective spherical reflective surfaces and having second openings on said system axis, collimated beams traveling on said axis being incident upon respective ones of said spherical reflective surfaces through said second openings, reflected onto said conic section reflective surfaces and then focused into said target cavity through said first openings.

2. The improvement set forth in claim 1 wherein said conic section reflective surfaces each comprise a substantially ellipsoidal reflective surface.

3. The improvement set forth in claim 2 wherein each said substantially ellipsoidal reflective surface is defined by the equation:

$$z = \frac{cy^2}{1 + \sqrt{1 - (k+1)c^2y^2}}$$

plus at least one higher order aspheric term, wherein $z$ is the departure of said reflective surface from a plane tangent to the vertex thereof, $c$ is the inverse vertex radius, $k$ is the surface conic constant and $y$ is the distance to said reflective surface measured from said system axis.

4. An optical system for providing illumination of a target region at high numerical aperture from a collimated beam of electromagnetic energy comprising first ellipsoidal reflective means having a first focus at said target region and a second focus displaced therefrom on a system axis, and second reflective means disposed to intercept and focus a said collimated beam to said second focus of said first means such that a said focused beam will be incident upon said first ellipsoidal reflective means and reflected thereby at high numerical aperture onto said target region, said second reflective means comprising means providing ellipsoidal and spherical reflective surfaces disposed in opposed relation on said system axis, said ellipsoidal reflective surface having a central opening for admitting said collimated beam, an aberrated first focus disposed on said axis and a second focus substantially coincident with said second focus of said first ellipsoidal reflective means, and wherein said spherical reflective surface has a focus substantially coincident with said first focus of said ellipsoidal reflective surface and a central opening on said axis for passing a focused beam to said first ellipsoidal reflective means.

5. An optical system for illuminating a target region at high numerical aperture from a collimated beam of electromagnetic energy comprising first ellipsoidal reflective means having a first focus at said target region and a second focus, second ellipsoidal reflective means having a central opening disposed to admit a said collimated beam, a first focus disposed substantially coincident with said first focus of said first reflective means and a second focus, and third reflective means disposed between said first and second reflective means to intercept a said collimated beam admitted through said central opening in said second reflective means and to focus a said intercepted collimated beam at substantially said second focus of said second reflective means, said third reflective means having a central aperture to permit a focused collimated beam reflected by said second reflective means to be incident upon said first reflective means and reflected thereby onto said target region, numerical aperture of said beam being progressively increased in reflections by said third, second and first reflective means successively.

6. The system set forth in claim 4 wherein said second ellipsoidal reflective means has an aberrated second focus, and wherein said third reflective means has a spherical reflective surface contour.

7. The system set forth in claim 4 wherein said third reflective means has a paraboloidal reflective surface contour.

* * * * *

UNITED STATES PATENT AND TRADEMARK OFFICE
CERTIFICATE OF CORRECTION

PATENT NO. : 4,084,887
DATED : April 18, 1978
INVENTOR(S) : Robert D. Sigler

It is certified that error appears in the above-identified patent and that said Letters Patent are hereby corrected as shown below:

Claim 6 (Col. 8, Line 11), change "4" to "5".

Claim 7 (Col. 8, Line 15), change "4" to "5".

Signed and Sealed this

Twenty-ninth Day of August 1978

[SEAL]

Attest:

RUTH C. MASON
Attesting Officer

DONALD W. BANNER
Commissioner of Patents and Trademarks